United States Patent [19]

Aposchanski et al.

[11] Patent Number: 4,644,474

[45] Date of Patent: Feb. 17, 1987

[54] HYBRID AIRFLOW MEASUREMENT

[75] Inventors: Alexander Aposchanski, Canton; Arthur J. Buglione, Garden City; James M. Coats, Dearborn, all of Mich.; Brian S. Edelman, Hiroshima, Japan

[73] Assignee: Ford Motor Company, Dearborn, Mich.

[21] Appl. No.: 691,259

[22] Filed: Jan. 14, 1985

[51] Int. Cl.[4] ........................ G01F 1/32; F02M 51/00

[52] U.S. Cl. ................................ 364/431.05; 73/195; 73/861.02; 73/118.2; 123/494

[58] Field of Search ..................... 73/195, 198, 861.02, 73/861.03, 118 A; 364/431.05, 510, 565; 123/494

[56] References Cited

U.S. PATENT DOCUMENTS

| | | | |
|---|---|---|---|
| 3,803,912 | 4/1974 | Ohno | 73/195 |
| 3,871,214 | 3/1975 | Masaki et al. | 73/195 |
| 4,142,407 | 3/1979 | Kuroiwa et al. | 73/197 |
| 4,386,520 | 6/1983 | Nagaishi | 73/118 A |
| 4,437,340 | 3/1984 | Csere et al. | 73/118 A |
| 4,502,325 | 3/1985 | Klomp | 73/861.02 |

*Primary Examiner*—Parshotam S. Lall
*Attorney, Agent, or Firm*—Peter Abolins; Keith L. Zerschling

[57] ABSTRACT

The amount of air entering an engine is determined by selecting the more accurate of two airflow determination means. One means measures a parameter characterizing airflow into the engine and has an adaptive correction. Another means calculates airflow into the engine as a function of engine speed and air density and has an adaptive correction.

2 Claims, 5 Drawing Figures

MODE SELECTION LOGIC FOR BASE AIR FLOW CALCULATION $$VVAF_{(n)} = VVAF_{(n+1)} + FKMAF * (IVAF - VVAF_{(n-1)})$$

$$VMDEL = MAFSD - MAFVM$$

HYSTERESIS FLIP-FLOP

| S(SET) | C(CLEAR) | Q-OUTPUT |
|---|---|---|
| 0 | 0 | NO CHANGE |
| 0 | 1 | 0 |
| 1 | 0 | 1 |
| 1 | 1 | 1 |

HYBRID AIRFLOW MEASUREMENT

BACKGROUND OF THE INVENTION

1. Technical Field

This invention relates to an engine control system.

2. Background Art

For better engine operation and for reducing undesirable exhaust gases, it is necessary to control the air fuel ratio. To control this air fuel ratio, a determination of air going into the engine is desirable.

Various airflow meters for measuring air intake into an internal combustion engine are known. For example, known types include a vane meter, a hot wire airflow meter and a vortex shedding airflow meter. Also known is a speed density calculation technique. In such a calculation, a measurement of pressure in the intake manifold is made, the air density is determined and the engine speed is determined to calculate the amount of air being inducted into the engine.

These known systems of airflow measurement have various drawbacks such as inaccuracy at extreme ranges of airflow either very high or very low, particularly due to dynamic range requirements. Introduction of exhaust gas recirculation (EGR) gases can also cause inaccuracies in some airflow calculations, as can changes in volumetric efficiency and air leaks in the induction air system. These are some of the problems this invention overcomes.

DISCLOSURE OF THE INVENTION

An engine control system includes an adaptive airflow meter means and an adaptive calculation means. The airflow meter means senses a parameter characterizing airflow into the engine and compensates for air leaks in the induction air system. The calculation means calculates airflow into the engine as a function of engine speed and air density and compensates for changes in volumetric efficiency. A selection means chooses either the output of the airflow meter or the calculation means to determine the amount of air entering the engine. By appropriately selecting one of the two airflow determination means, there results an improved accuracy of airflow measurement. Adaptive correction of airflow is provided by compensating for changes in volumetric efficiency when calculating airflow and correcting for air leaks when measuring airflow.

BEST MODE FOR CARRYING OUT THE INVENTION

Figure 1:
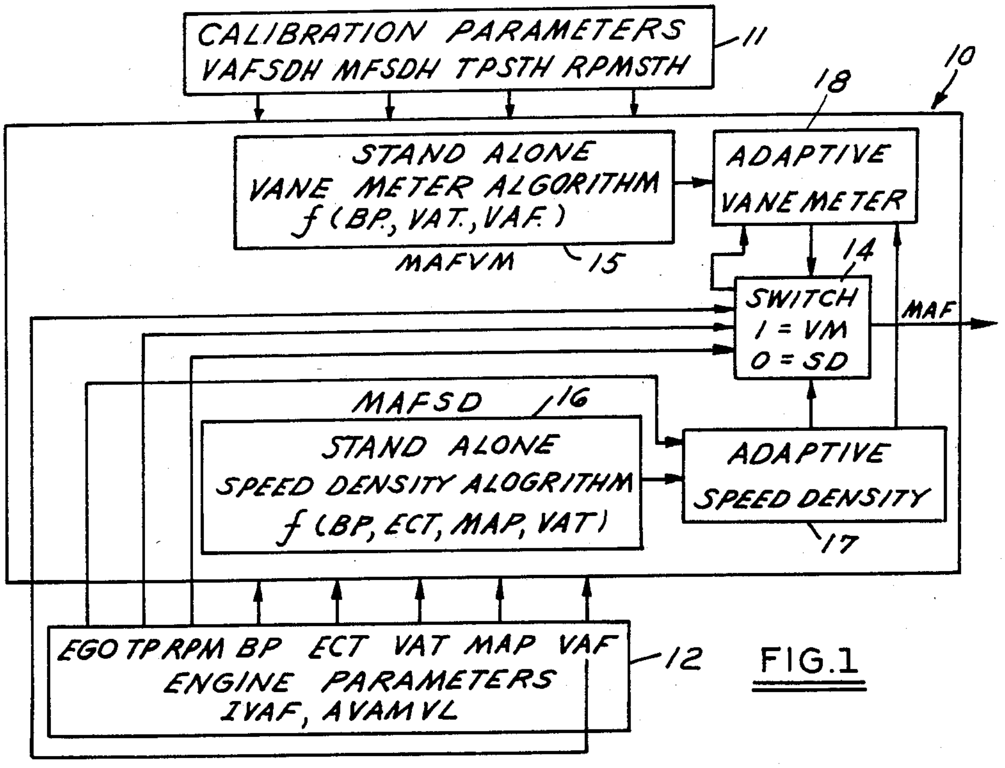
FIG. 1 is a block diagram of an engine control system with an airflow determination in accordance with an embodiment of this invention.

Referring to FIG. 1, a mass airflow computation apparatus 10 includes an engine calibration reference parameter storage 11 and an engine operating parameter storage 12 having outputs applied to apparatus 10. Storage 11 includes a magnitude of air flow detected by an airflow meter (e.g. a vane air meter) to enter speed density (VAFSD), a magnitude of mass air flow to enter speed density (MFSD), a preset threshold for throttle position (TPST), and a preset threshold for engine speed (RPMST). Storage 12 includes barometric pressure (BP), engine coolant temperature (ECT), manifold absolute pressure (MAP), temperature of incoming air (VAT), engine speed (RPM), throttle position (TP), exhaust gas oxygen (EGO), and average air mass value taken into the engine (AVAMVL). The term IVAF is a representation of an electrical signal from the airflow meter indicating magnitude of air flow.

An adaptive speed density correction circuit 17 has an input from speed density airflow calculator 16 and an input from engine operating parameter storage 12 supplying EGO in order to produce a correction term SDAMOF which is derived by adding a term, SDDEL to the previous correction term $SDAMOF_{n-1}$. That is, $$SDAMOF_n = SDAMOF_{n-1} + SDDEL$$

wherein,

SDDEL=(1−LAMAVE)*AVAMVL where

LAMAVE is the average normalized air fuel ratio, and

AVAMVL is the average air mass flow.

AVAMVL is a feedback parameter derived from the eventual output of mass airflow computation apparatus 10.

The correction using the term SDDEL occurs only under the following conditions. Otherwise, SDDEL is set to zero indicating no adaptive correction. The first condition is that there is closed loop engine control of fuel (i.e. OLFLG=1). Second, the engine is in the closed throttle position (i.e. APT=−1). Third, the exhaust gas oxygen sensor must be operating above a desired minimum temperature and be switching between two output levels sufficiently rapidly. Fourth, the engine coolant temperature must be above a predetermined value (ECT>ECTAMF). Fifth, the engine speed is within a predetermined range indicating idle RPM, (DSDRPM−AMON)<RPM<(DSDRPM+AMON). Sixth, the mass airflow generated by mass airflow computation apparatus 10 is done by using a speed density calculation (instead of a measured airflow).

SDAMOF can be stored in KAM to improve adaptive performance.

An adaptive airflow meter circuit 18 has an input from airflow vane meter indicator 15 and produces an output error term, VMDEL, which is the difference between speed density airflow calculation and airflow meter measurement at the transition point between these two algorithms. Assuming the speed density calculation performed by calculator 16 has been corrected by adaptive speed density correction circuit 17 and is accurate, the difference between the measurement and calculation algorithms is assumed to be due to air leaks in the air induction system which are not measured by the airflow meter (i.e. downstream of the air meter).

Thus,

VMDEL=MAFSD (corrected valve)−MAFVM (uncorrected valve)

The above two values of MAFSD and MAFVM are computed simultaneously.

In order to compute an unambiguous value for VMDEL, this error value is computed only at one specific engine condition near idle. That is, the engine condition is the transition from speed density mode to airflow meter mode for the mass airflow calculation. This value of VMDEL is used to compute the airflow meter mass airflow offset correction, VMAMOF, by iteration as follows:

$$VMAMOF_n = VMAMOF_{n-1} + VMOFRC*VMDEL$$

where VMOFRC is a specific calibratable fraction less than 1.0.

The correction term, VMAMOF, can also be stored in a keep-alive memory to improve adaptive performance.

The air mass value, AMVAL, is then computed by $$AMVAL = MAF*AMGAIN + EAMOFF$$

wherein

EAMOFF is an external airmeter offset discussed further later AMGAIN is the air metering gain MAF is the mass airflow calculation from the airflow meter or the speed density equation.

$AVAML_n = AMVAL$ in wide open throttle (WOT) and part throttle.

In closed throttle, $$AVAML_n = \frac{\Sigma AMVAL}{AMSAMP},$$

if AMCNT≧AMSAMP wherein

AMSAMP is a calibration parameter for the number of samples in the average, and

AMCNT is the number of air mass samples and, $AVAML_n = AVAML_{n-1}$ if AMCNT<AMSAMP If $$AVAML_n = \frac{\Sigma AMVAL}{AMSAMP}$$

then Σ AMVAL and AMCNT are reset to zero to get ready for the next average.

A switch 14 has an input from adaptive airflow meter circuit 18, an input from adaptive speed density correction circuit 17 and an input from engine parameters 12. The internal logic of switch 14 uses the inputs from adaptive airflow meter circuit 18, adaptive speed density correction circuit 17, and from engine parameters 12 (TP, RPM, VAF) to select between the two methods of mass air flow determinations. The logic of switch 14 is further discussed in connection with FIG. 3 and an implementation is shown in FIG. 4.

Figure 2:
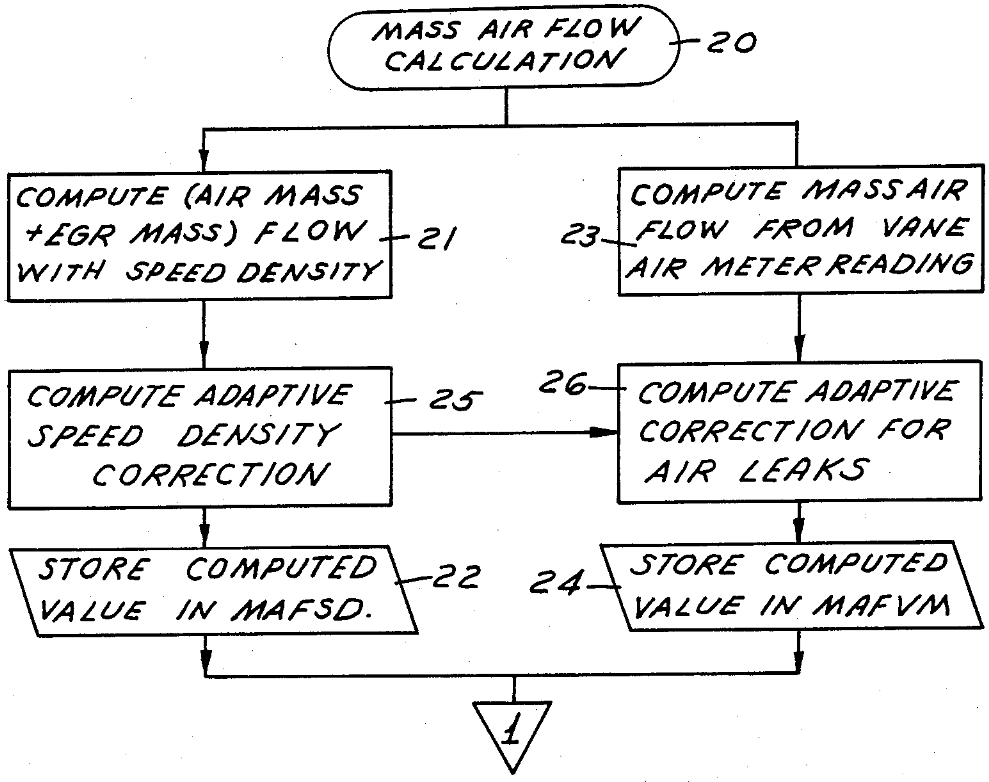
FIGS. 2 and 3 are logic block diagrams of a mass airflow calculation in accordance with an embodiment of this invention.

Referring to FIG. 2, a logic block flow diagram representing the switching action between adaptive speed density correction circuit 17 and adaptive airflow meter circuit 18 is shown. Mass airflow calculation starts at a block 20 and goes through two parallel paths. A first path includes a block 21 wherein the air mass and exhaust gas recirculation mass flow is determined using speed-density equation. Block 25 computes an adaptive speed density correction factor. Block 22 indicates that the value computed in block 25 is stored. Analogously, in a second path, at a block 23 the mass air flow is computed from an airflow meter reading. Block 26 determines an adaptive correction factor for air leaks. At block 24, the value computed in block 26 is stored.

Figure 3:
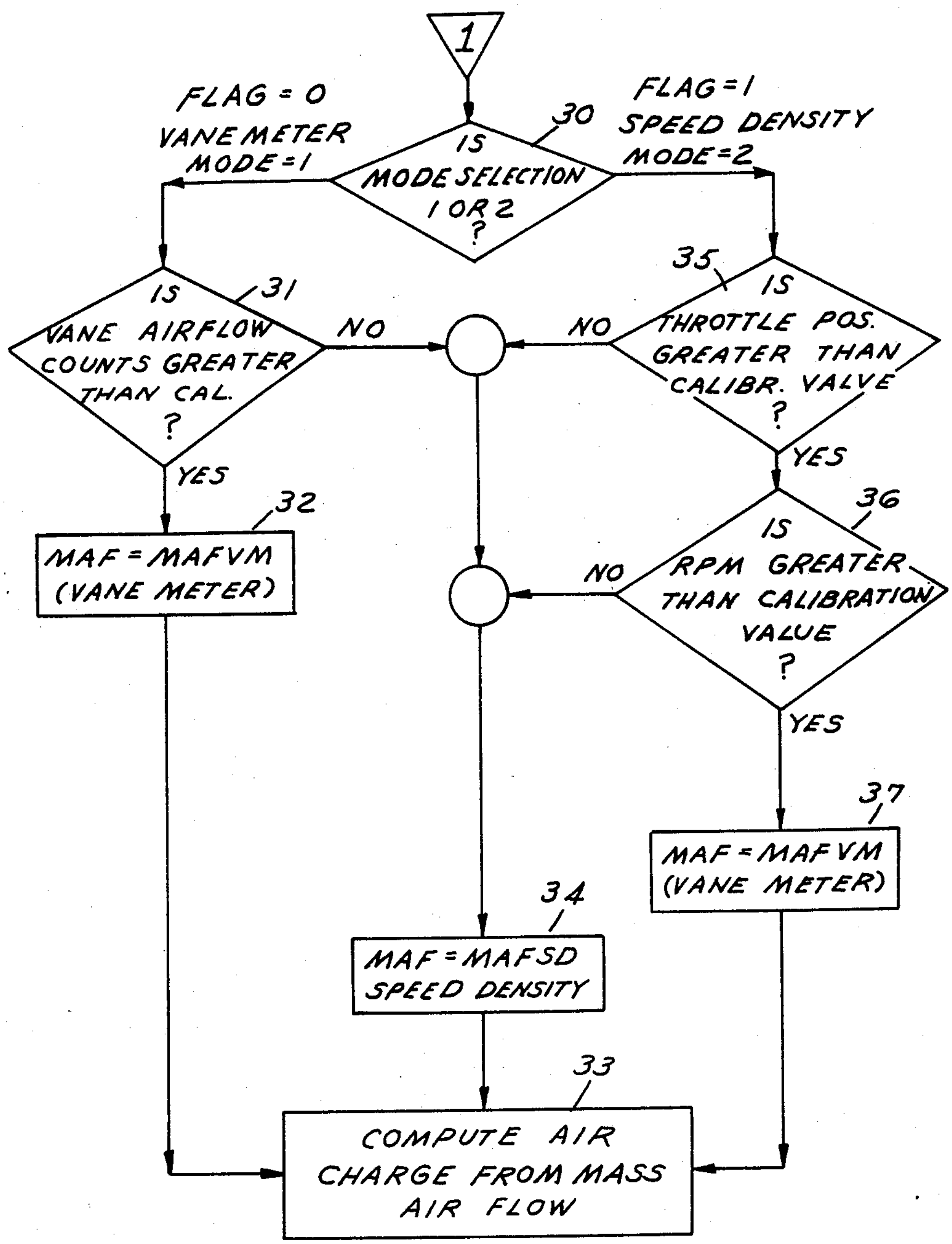
Figures 4, 5:
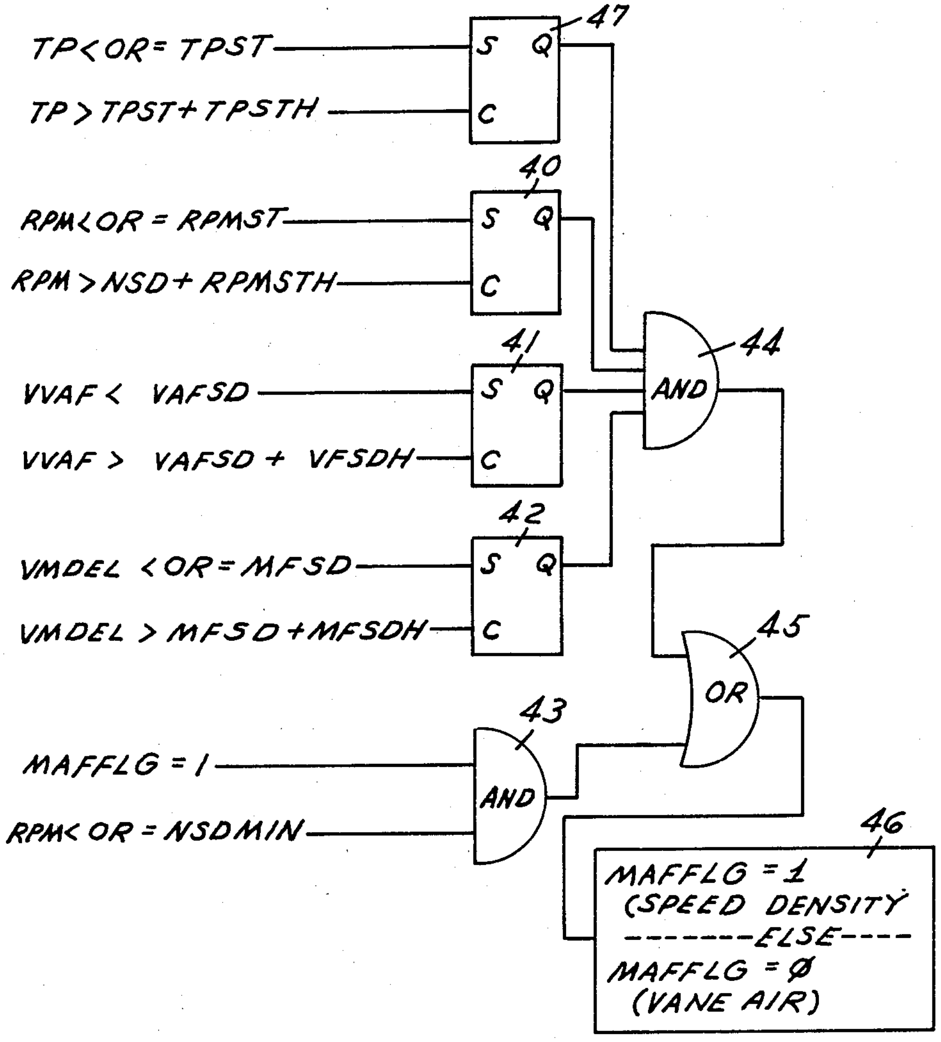
FIG. 4 is a schematic block diagram implementation of FIG. 3 showing the inputs and logic operations to determine airflow in accordance with an embodiment of this invention.
FIG. 5 is an output table for a hysteresis flip-flop.

Referring to FIG. 3, a selection between the airflow values determined by airflow meter indicator 15 and speed density airflow calculator 16 is made to determine the output of switch 14. More specifically, a block 30 indicates whether the selection mode is in Mode One, using the airflow meter measurement with an indicating flag equal to zero or in Mode Two, using the calculated speed-density airflow with an indicating flag equal to one. If Mode One is selected, the logic flow goes to a decision block 31 wherein the stored output of the airflow meter magnitude is compared to a predetermined airflow threshold. If the magnitude of the airflow is greater than the predetermined airflow threshold, the logic proceeds to a block 32 wherein the mass airflow is set equal to the mass airflow as determined by the airflow meter. The logic flow then goes to a block 33 wherein there is a computation of the air charge from the mass airflow. If the airflow meter magnitude is less than or equal to the predetermined threshold, logic flow goes to a block 34 wherein the mass airflow is set equal to the computed mass airflow in accordance with the speed-density equation.

If the speed-density calculation mode, Mode Two, is selected in block 30, the logic flow goes to block 35 wherein the throttle position magnitude is compared to a predetermined threshold. If the throttle position magnitude is less than or equal to the predetermined threshold, the logic flow goes to block 34 wherein the mass air flow is set equal to the mass airflow as computed by speed density. If the throttle position magnitude is greater than the predetermined threshold, logic flow goes to a block 36 wherein the engine speed in RPM is compared to a predetermined threshold. If the engine speed RPM is less than or equal to the predetermined threshold, logic flow goes again to block 34 wherein mass airflow is set equal to the speed density calculated mass airflow. If the engine speed RPM is greater than the predetermined threshold, logic flow goes to a block 37 wherein the mass airflow is set equal to the mass airflow measured by the air meter. From block 37, the logic goes to block 33 wherein the air charge is computed from the mass airflow.

Referring to FIG. 4, a particular logic flow embodiment of the apparatus 10 of FIG. 1 using the logic flow of FIG. 3 is illustrated using hysteresis flip-flops, AND gates and OR gates. A hysteresis flip-flop has a set input and clear input and an output. An output truth table for a hysteresis flip-flop is shown as FIG. 5. In operation, when the set input of the flip-flop is true, regardless of the clear input level, the flip-flop sets and the output is true. The flip-flop remains set and the output stays true until the set input is false and the clear input is true. Then the flip-flop clears and the output is false.

Referring again to FIG. 4, a hysteresis flip-flop 47 has a set input which is one when the throttle position is less than or equal to a preselected throttle position threshold. If throttle position magnitude is greater than the preselected throttle position threshold, the input to the set is zero. The input to the clear input of flip-flop 47 is one when the throttle position magnitude is greater than the preselected throttle position threshold plus the hysteresis necessary to select airflow as measured by an air meter. A hysteresis flip-flop 40 has a set input which is one when the engine speed RPM is less than or equal to an engine speed threshold necessary to select the speed-density calculation method of determining airflow. If engine speed RPM is greater than the threshold, the input to the set is zero. The input to the clear input of flip-flop 40 is one when the engine speed RPM is greater than the engine speed threshold to select a speed density calculation plus the hysteresis engine speed necessary to select airflow as measured by an air meter.

A hysteresis flip-flop 41 has a set input which is one when the averaged airflow meter magnitude is less than the airflow threshold necessary to enter the speed density calculation. The input to the set of flip-flop 41 is zero when the averaged airflow meter magnitude is greater than or equal to the airflow threshold necessary to enter speed density calculation. The clear input of flip-flop 41 is one when the airflow meter magnitude is greater than the sum of the airflow threshold necessary to enter speed density calculation plus hysteresis to re-enter the vane airflow measurement. If the airflow meter magnitude is less than or equal to the sum of these two quantities, the input is zero. A hysteresis flip-flop 42 has a set input which is equal to one when the airflow meter magnitude delta from the speed density calculation is less than or equal to the mass airflow computed by speed density. The input to the set of flip-flop 42 is zero if the airflow meter magnitude delta is greater than the mass airflow computed by speed density. The input to the clear input of flip-flop 42 is one when the airflow meter magnitude delta is greater than the sum of the threshold necessary to enter speed density calculation plus the hysteresis to re-enter the airflow meter measurement. Airflow meter magnitude delta is a correction factor to adjust the valve of the airflow meter measurement to the value of the speed density calculation at the switch point from using the speed density calculation to using the airflow meter measurement. That is, the correction factor assumes that the speed density calculation is correct at the switch point. The value of airflow meter magnitude delta is equal to the mass airflow calculated using the speed density method less the mass airflow calculated using the airflow meter method at the transition point between using the speed density calculation and the airflow meter measurement.

An AND gate 43 has a first input which is one when the mass airflow flag is set. The input is zero when the airflow meter measurement is used and the input is one when the speed density calculation is used. A second input to AND gate 43 is one when the engine speed RPM is less than or equal to the minimum engine speed RPM to allow transition from the speed density calculation to the airflow meter measurement in the mass airflow calculation.

The outputs of flip-flops 40, 41, 42 and 47 are applied as inputs to an AND gate 44. The output of AND gate 44 and the output of AND gate 43 are applied as two inputs to an OR gate 45. The output of OR gate 45 is applied to a calculation block 46 wherein speed density is used to compute airflow if there is a one input and the airflow meter magnitude is used to compute airflow if there is a zero input.

In the airflow meter mass air calculation indicated in block 15 of FIG. 1, using a vane meter, the mass airflow determined by the vane airflow meter (MAFVM) is equal to the vane airflow meter correction factor (KFVAF) times the characteristic function of the vane airflow meter (FN013 (IVAF)) times the square root function of the barometric pressure (BP) divided by vane air temperature (VAT) in degrees Fahrenheit plus 460, the product being added to the sum of the vane meter offset (VMOFF) for calibration plus the adaptive vane meter offset (VMAMOF).

$$MAFVM = (KFVAF)\,(FN103\,(1VAF))\sqrt{BP/(VAT + 460)} + VMOFF + VMAMOF$$

The speed density calculation of block 16 of FIG. 1 has engine parameter inputs of barometric pressure, engine coolant temperature, manifold absolute pressure and inlet air temperature. This calculation is done to measure airflow into the engine at low engine speeds and loads. It is used for a closed throttle mode, mainly at idle.

$$\text{MAFSD} = \frac{(BASEMD)\,(MAP)\,(NBAR)}{ESTACT + 460} * FN326\,(ECT) * (FN081\,(NBAR) * FN082\,(MAP) * FN305\,(ESTACT) + SDOFF + SDAMOF$$

wherein:

- MAFSD—mass airflow calibration from speed density
- BASEMD—speed density multiplier
- MAP—manifold air pressure
- NBAR—rolling average of engine revolutions per minute
- ESTACT—estimated air charge temperature
- FN081(NBAR)—volumetric efficiency versus NBAR to modify MAFSD with volumetric efficiency
- FN082(MAP)—speed density multiplier versus MAP to modify MAFSD with volumetric efficiency
- FN305 (ESTACT)—speed density multiplier versus ESTACT to modify MAFSD with ESTACT
- FN326 (ECT)—speed density multiplier versus engine coolant temperature (ECT) to modify MAFSD with ECT
- SDOFF—an offset term which is adjustable during calibration development, and fixed during production
- SDAMOF—the adaptive speed density offset and is used to correct for variances in the volumetric efficiency from vehicle to vehicle or with the passage of time. The magnitude of SDAMOF is restricted to minimize any impact of erroneous inputs to the SDAMOF calculation.

The base value of mass airflow is given by the first portion of the equation:

$$(BASEMD*MAP*NBAR)/(ESTACT+460)$$

when the airflow is deduced from the volume of air inducted per unit time and the density of the air inducted into the cylinders.

$$\frac{\text{Volume Inducted}}{\text{time}} = \frac{\text{(\# of Cylinder Events)}}{\text{Engine Revolution}} * \frac{\text{(Volume of Air Inducted)}}{\text{Cylinder event}} * \text{(Avg. Engine RPM)}$$

The first two of the three terms to the right of the equal sign are constants, and are contained in BASEMD. The third term is given as NBAR.

Density of Air Inducted into Cylinders =

$$\frac{\text{Density of Air at Standard Temp. \& Pressure} * \text{(Manifold Air Pressure)}}{\text{Absolute Air Temp.}}$$

Air density is also a constant and is also included in BASEMD, so that BASEMD is a collection of constants grouped together.

Manifold Air Pressure is given by MAP, and the Absolute Air Temperature is given by (ESTACT+460).

The first portion of the speed density equation will not yield the actual value of mass airflow, however, because it assumes that the air in the intake manifold is pumped into the cylinders through the intake valves with 100% efficiency. Actually, there are significant pumping losses, and when the intake valve opens a residue of compressed exhaust gas (which was trapped inside the cylinder) rushes into the intake manifold and somewhat dilutes the combustion products.

The amount of these pumping losses (etc. varies from one type of engine to another, and is dependent upon many parameters—including Engine Speed=NBAR Manifold Air Pressure=MAP Manifold Air Temperature=ESTACT Manifold Wall Temperature=ECT The speed density airflow calculation assumes that the dependence of the pumping losses can be expressed by an independent function of each of these variables (as an approximation) and these four correction functions are given by

FN081 (NBAR)

FN082 (MAP)

FN305 (ESTACT)

FN326 (ECT)

Various modifications and variations will no doubt occur to those skilled in the art to which this invention pertains. For example, the particular approximations used in the calculation of the speed density equation may be varied from that disclosed herein. These and all other variations which basically rely on the teachings through which this disclosure has advanced the art are properly considered within the scope of this invention.

We claim:

1. An engine control system for determining airflow by selecting between a calculated airflow using engine speed and air density and a measured airflow using an air meter, comprising:

a first hysteresis flip-flop circuit having a set input of "1" when engine speed is less than or equal to a first threshold engine speed for switching to using a calculated airflow from a measured airflow and having a set input of "0" when engine speed is greater than the first threshold engine speed;

said first hysteresis flip-flop having a clear input of "1" when engine speed is greater than the sum of the first threshold engine speed and a second threshold engine speed for switching to a measured airflow and having otherwise, when the engine speed is less than or equal, a clear input of "0";

a second hysteresis flip-flop having a set input of "1" when the average measured airflow is less than a threshold airflow for switching to using a calculated airflow and having otherwise, when measured airflow is greater than or equal, a set input of "0";

said second hysteresis flip-flop having a clear input of "1" when the average measured airflow is greater than the sum of the threshold airflow plus an additional hysteresis airflow for switching to using measured airflow, and having otherwise, when measured airflow is less than or equal, a clear input of "0";

a third hysteresis flip-flop having a set input of "1" when an air meter correction factor is less than or equal to a threshold calculated airflow for switching to using a calculated airflow and having otherwise, when the air meter correction factor is greater than, a set input of "0";

said third hysteresis flip-flop having a clear input when the air meter correction factor is greater than the sum of the threshold calculated airflow plus an additional hysteresis airflow for switching to using measured airflow and otherwise, when the air meter correction factor is less than or equal to, a clear input of "0";

a fourth hysteresis flip-flop circuit having a set input of "1" when throttle position is less than or equal to a first threshold throttle position for switching to using a calculated airflow from a measured airflow and having a set input of "0" when engine speed is greater than the first threshold throttle position;

said fourth hysteresis flip-flop having a clear input of "1" when the throttle position is greater than the sum of the first threshold throttle position and a second threshold throttle position for switching to a measured airflow and having otherwise, when throttle position is less than or equal, a clear input of "0";

a first AND gate having a first input of "1" when airflow is being determined by calculated airflow and "0" when air is being determined by measured airflow;

said first AND gate having a second input of "1" when engine speed is less than or equal to a minimum engine speed to allow transition from calculated to measured airflow, and otherwise, when engine speed is greater than a second input of "0";

a second AND gate having as four inputs the four outputs of said first, second, third and fourth hysteresis flip-flops;

an OR gate having as two inputs the output of, said first and second AND gates; and said OR gate having an output indicating a selection of using calculated airflow when the OR output is "1" and using measured airflow when the OR output is "0".

2. An engine control system as recited in claim 1 wherein said air meter correction factor is a function of the difference between the speed density calculated airflow and the measured airflow at a transition point from using speed density calculated airflow to using measured airflow as the determined airflow.

* * * * *